United States Patent
Ortiz et al.

(10) Patent No.: US 10,663,964 B2
(45) Date of Patent: May 26, 2020

(54) UNIFIED AND REDUNDANT FLIGHT AND MISSION CONTROL FOR AN UNMANNED AERIAL VEHICLE

(71) Applicant: Facebook, Inc., Menlo Park, CA (US)

(72) Inventors: Jose Enrique Ortiz, Cupertino, CA (US); Arjen Roodselaar, Burlingame, CA (US)

(73) Assignee: FACEBOOK, INC., Menlo Park, CA (US)

( * ) Notice: Subject to any disclaimer, the term of this patent is extended or adjusted under 35 U.S.C. 154(b) by 345 days.

(21) Appl. No.: 15/840,440

(22) Filed: Dec. 13, 2017

(65) Prior Publication Data

US 2019/0041851 A1    Feb. 7, 2019

Related U.S. Application Data

(60) Provisional application No. 62/541,548, filed on Aug. 4, 2017.

(51) Int. Cl.
*G05D 1/00* (2006.01)
*B64C 39/02* (2006.01)
*G05D 1/10* (2006.01)

(52) U.S. Cl.
CPC ......... *G05D 1/0077* (2013.01); *B64C 39/024* (2013.01); *G05D 1/0022* (2013.01); *G05D 1/0027* (2013.01); *G05D 1/104* (2013.01); *B64C 2201/028* (2013.01); *B64C 2201/042* (2013.01); *B64C 2201/066* (2013.01); *B64C 2201/146* (2013.01); *B64D 2211/00* (2013.01)

(58) Field of Classification Search
None
See application file for complete search history.

(56) References Cited

U.S. PATENT DOCUMENTS

| | | | |
|---|---|---|---|
| 2006/0062143 A1* | 3/2006 | Bibby | G05D 1/0077 370/225 |
| 2006/0100750 A1* | 5/2006 | Platzer | G05D 1/0077 701/3 |
| 2007/0233330 A1* | 10/2007 | Beutler | G05D 1/0077 701/3 |

* cited by examiner

*Primary Examiner* — Richard M Camby
(74) *Attorney, Agent, or Firm* — Keller Jolley Preece

(57) ABSTRACT

One or more embodiments of the present disclosure include features and functionality that reduce size, weight, and power (SWaP) specifications for an unmanned aerial vehicle (UAV) by combining flight control functionality with mission processing functionality within common hardware. By implementing flight control and mission processing functionality using common hardware, systems and methods described herein decrease costs associated with developing, producing, servicing, and operating UAVs. Moreover, the systems and methods described herein include features that reduce the SWaP for the UAV while providing further redundancies that maintain reliability of the UAV.

20 Claims, 5 Drawing Sheets

UNIFIED AND REDUNDANT FLIGHT AND MISSION CONTROL FOR AN UNMANNED AERIAL VEHICLE

CROSS REFERENCE TO RELATED APPLICATIONS

This application claims the benefit of and priority to U.S. Provisional Patent Application No. 62/541,548, filed Aug. 4, 2017, which is incorporated herein by reference in its entirety.

BACKGROUND

Aerial vehicles are becoming increasingly common. For example, consumers, governments, and various enterprises have begun to utilize unmanned aerial vehicles (UAVs) to perform various operations. While increased usage of UAVs have reduced the cost and increased the ease of various flight operations, UAVs have various difficulties and drawbacks. For example, UAVs generally need to periodically refuel, recharge, and/or receive maintenance in order to operate reliably. In addition, with increased functionality and more complex missions, UAVs often require electrical housing, circuitry, power supplies, and other electrical components that contribute to the overall weight of the UAV. Increased and more complicated payloads cause UAVs to consume more power and increase the frequency of needed docking and maintenance.

In addition, because safety is a major consideration when operating UAVs, UAV circuitry often includes redundant hardware to be compliant with safety and reliability requirements. Indeed, many UAVs include multiple redundancies to ensure that the UAV does not crash and potentially harm people or property. These redundancies, when implemented as single function and separate Line Replaceable Units (LRU), contribute substantially to the overall weight of the UAV and cause the UAV to consume more power. In addition, having redundant LRUs contributes to the costs of developing, producing, servicing, and operating the UAV.

These and other problems exist with regard to UAVs.

BRIEF SUMMARY

One or more embodiments of the present disclosure provide benefits and/or solve one or more of the foregoing problems in the art with systems including features and functionality that reduce size, weight, and power (SWaP) specifications for a UAV by combining flight control functionality with mission processing functionality and data concentrator functionality within a common hardware LRU. By implementing flight control and mission processing functionality using shared hardware, systems described herein decrease costs associated with developing, producing, servicing, and operating UAVs. Moreover, as will be described in further detail below, the systems described herein include features that reduce the SWaP for the UAV while providing redundancies that maintain reliability of the UAV.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings in which.

DETAILED DESCRIPTION

Figure 1:
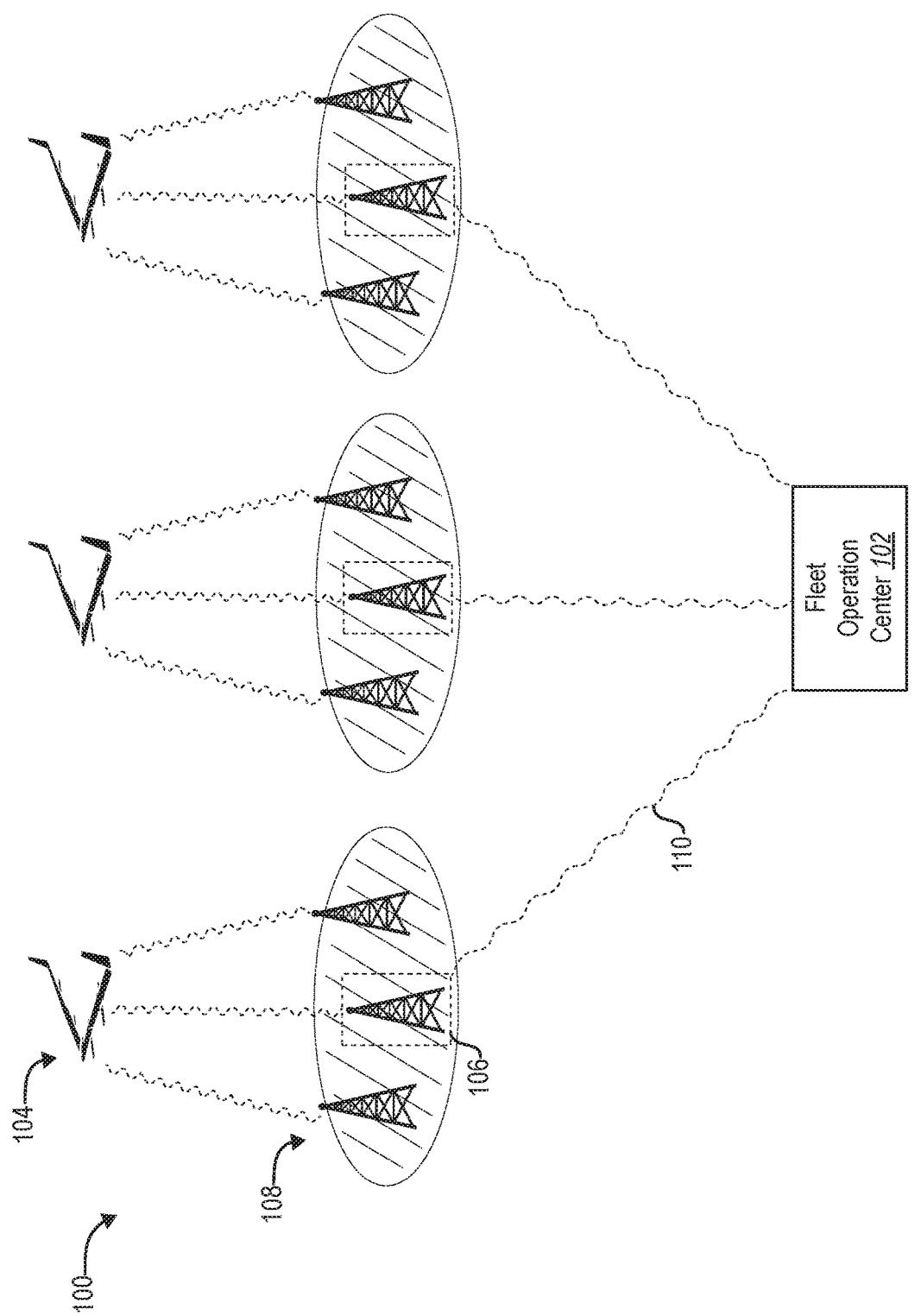
FIG. 1 is a diagram of an example environment in which an unmanned aerial vehicle (UAV) operates.

One or more embodiments described herein relate to a flight control computer (FCC) system that includes features and functionality that reduce the size, weight, and power (SWaP) for an unmanned aerial vehicle (UAV) while maintaining reliable functionality of both flight control and mission processing for the UAV. For example, in one or more embodiments, the FCC system incorporates combined hardware that provides both flight control functionality (e.g., flight critical functionality) in addition to mission processing functionality of the UAV. In particular, the FCC system includes multiple processing lanes that each include hardware for executing both flight control functionality and mission processing functionality.

In particular, one or more embodiments described herein relate to a flight control computer (FCC) that includes a plurality of processing lanes for executing flight control functions and mission processing functions. For example, each processing lane includes flight control and mission processors and memory, a data concentrator unit (DCU), and respective input/output (I/O) interfaces coupled to components of the respective processing lane. The FCC system further includes a cross data channel link (CDDL) coupled to each of the processing lanes. In addition, the FCC system includes a bussed I/O coupled to each of the processing lanes and an Ethernet interface including Ethernet network connections each coupled to some, or all, of the processing lanes. The FCC system is supported by multiple power sources that provide redundant power to one or multiple processing lanes within the FCC system. Accordingly, where a power input, power source, or power bus for a given processing lane fails, the FCC system can continue to operate.

Combining the flight control and mission processing within combined hardware components reduces total circuitry, saving valuable real-estate within the UAV, decreasing overall SWaP for the UAV, and reducing costs associated with developing, producing, servicing, and operating the UAV. For example, decreasing a total number of LRUs on board the UAV reduces the number of printed circuit boards and discrete components that contribute to the overall weight of the UAV, thereby reducing the total weight of the UAV. Reducing the total weight of the UAV decreases fuel required and increases total flight time of the UAV.

The FCC system further decreases the SWaP of the UAV (thereby reducing total weight and improving fuel efficiency) by enclosing the hardware for both flight control functionality, mission processing functionality, and data concentrator functionality within a single housing. In particular, in one or more embodiments, each of the processing lanes of the FCC system are enclosed within a single housing, thus reducing excess weight of the UAV as a result of discrete housing structures around each individual processing lane and/or housing around separate hardware for flight control and mission processing functionality, and DCU I/O functionality. For example, rather than having discrete housing around each FCC, DCU, and independent mission processors, the FCC system encloses multiple lanes each including FCCs having shared hardware and DCUs within a common housing. As mentioned above, decreasing the weight of the UAV system increases flight duration, thereby decreasing inconvenience and cost associated with frequent landing, taking off, and servicing of the UAV.

In addition, the FCC system combines hardware for executing flight control and mission processing while maintaining (and even increasing) redundancy within the FCC system to ensure reliability in operation of the UAV. For example, the FCC system includes data concentrator units (DCUs) for each processing lane that provide data for executing both flight control and mission processing functions. By including a DCU that facilitates multiple types of functionality within each individual processing lane, the FCC system provides at least the same amount of redundancy for flight control functionality while increasing redundancy for the mission processing functionality. For example, where standards and regulations may require a higher level of reliability for flight control functionality to prevent potential catastrophic failure or safety issues than for mission processing, having a DCU within each processing lane can maintain the high level of redundancy to meet the loftier standards and regulations of flight control (e.g., flight critical) operations. Nevertheless, even though mission processing functionality may have more relaxed requirements for redundant processing than flight control functionality, the FCC system described herein provides redundancy at the same level as flight control functionality (e.g., quad-redundancy), further increasing reliability of executing mission processing functions accurately.

Moreover, in one or more embodiments, the FCCs for the processing lanes cooperate to maintain state synchronization between the processing lanes. For example, in one or more embodiments, the FCC system further reduces SWaP of the UAV by implementing a cross channel data link (CCDL) that provides an interconnected mesh between the processing lanes with a compact and small interface. Implementing the CCDL provides full connectivity between the processing lanes without the need for bridge(s) and/or switch(es) to enable state synchronization between the processing lanes and maintaining lockstep execution between the processing lanes. The CCDL enables processing lanes to share sensor data, computing results, and, in one or more embodiments, monitors and votes on sensor inputs and effector outputs. In addition, in one or more embodiments, the CCDL provides interconnectivity between processing lanes as an alternative to implementing various interconnectivity functions via field-programmable gate arrays (FPGAs), which often take up valuable real estate and contribute to the overall SWaP of the UAV.

Additional detail will now be given in relation to illustrative figures portraying exemplary embodiments. For example, FIG. 1 illustrates an environment in which UAVs may operate in accordance with one or more embodiments described herein. For example, FIG. 1 illustrates an example environment in which one or more high altitude long endurance (HALE) UAVs provide connectivity (e.g., Internet connectivity) to one or more areas. For example, the UAVs may be dispatched to provide connectivity to areas with no connectivity or limited connectivity (e.g., 2 Gs or less).

In particular, FIG. 1 illustrates an example environment 100 including a fleet operation center (FOC) 102 that communicates with a number of UAVs including features and functionality as described in one or more embodiments herein. By way of example shown in FIG. 1, the environment 100 includes a UAV 104 in communication with a gateway 106 and customer premise equipment (CPE) 108. As further shown, the gateway 106 communicates with the FOC 102 by way of a communication link 110 (e.g., radio frequency (RF) link, data backhaul link) over which the FOC 102 provides command and control data and receives data from the UAV 104. While FIG. 1 illustrates an example environment 100 including the FOC 102 and three UAVs, it will be appreciated that the FOC 102 can provide a single fleet operation center to any number of UAVs by way of respective communication channels, gateways, and CPE.

By way of example, the FOC 102 can make use of various types of computing devices to receive and/or transmit data to the UAVs by way of respective gateways. For example, in one or more embodiments, the FOC 102 may make use of one or more server device(s). In addition, in one or more embodiments, the FOC 102 includes or otherwise implements various non-mobile or mobile client devices such as desktop computers, servers, laptops, tablets, etc. Additional detail with regard to different types of computing devices is described in reference to FIG. 5.

In addition, as shown in FIG. 1, in one or more embodiments, the FOC 102 communicates with the UAVs by way of gateways via a communication link 110 (e.g., an RF link) between the FOC 102 and respective gateways. It will be understood that the FOC 102 can communicate with the gateways and/or UAV by way of one or multiple networks that make use of one or more communication platforms or technologies suitable for transmitting data. In one or more embodiments, the FOC 102 communicates with the gateways via an RF link. Alternatively, in one or more embodiments, the FOC 102 communicates with the gateways via other types of networks using various communication technologies and protocols.

In one or more embodiments, a UAV (e.g., UAV 104) is dolly launched and climbs to a high altitude (e.g., over 60,000 feet) through controlled airspace. The UAV may transit to an area of operation and, when arrived on-station, may provide Internet backhaul to ground-based cellular base stations (e.g., CPE). In one or more embodiments, command, control, and telemetry for the UAVs is accomplished from the FOC 102 through a secure channel over the Internet backhaul, which reduces operation costs while improving command and control (C2) bandwidth and latency. In one or more embodiments, a secondary link for C2 is provided by a satellite communication system.

In one or more embodiments, the UAV primarily performs operations independent from a satellite communication (SATCOM) datalink. For example, in one or more embodiments, the UAV utilizes a SATCOM datalink exclusively for command and control and emergency operations. In one or more embodiments, a radio frequency datalink is used to provide connectivity between the UAV and base stations/gateway. In one or more embodiments, a radio frequency datalink is used to provide connectivity between the UAV and customer end points. In addition, in one or more embodiments, the UAV connects to a base station (e.g., ground entry point/gateway) via an optical link.

Figure 2:
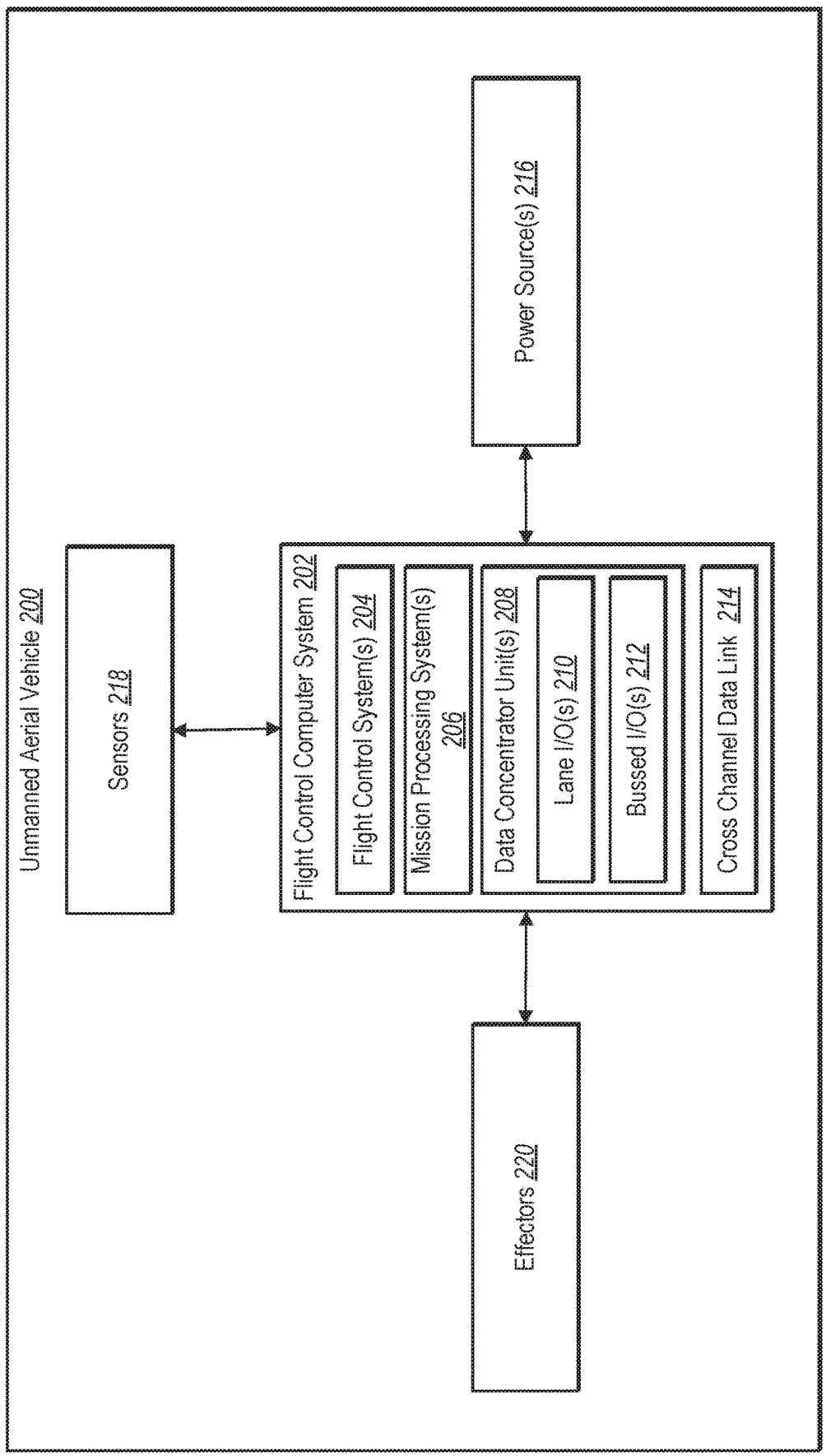
FIG. 2 is a schematic diagram of a UAV including a flight control computer (FCC) system in accordance with one or more embodiments.

As mentioned above, systems and methods described herein accomplish many of the above benefits by implementing a flight control computer system on a UAV including hardware for performing both flight control functionality and mission processing functionality. For example, FIG. 2 shows an unmanned aerial vehicle 200 (UAV 200) including a flight control computer system 202 (FCC system 202) including hardware (e.g., one or more processors) programmed to execute flight control functions and mission processing functions. For instance, as shown in FIG. 2, the FCC system 202 including a flight control system 204 that executes flight control functions and a mission processing system 206 that executes mission processing functions. As will be described in further detail below, the FCC system 202 includes the flight control system 204 and mission processing system 206 within the same processing lanes and which execute respective functions using common hardware. In addition, in one or more embodiments, the FCC system 202 includes redundant flight control system(s) 204 and mission processing system(s) 206.

As used herein, "flight control" or "flight critical" functionality refer interchangeably to functionality of a UAV that relates to a critical component or functionality of the UAV whose failure, malfunction, or absence results in loss of one or more flight functions or even a catastrophic failure of the UAV. In one or more embodiments, flight control functionality refers to any functionality whose failure could cause reduction in performance and/or loss of or damage to the aircraft including, for example an engine shutdown resulting in unsafe operation of the UAV. In one or more embodiments, critical functionality includes functionality provided by processors, memory, the cross-channel data link, input/output (I/O) interfaces, power supplies, and power busses.

As used herein, "mission processing" functionality refers to functionality of the UAV that relates to executing operations and instructions other than critical functions of the UAV. In one or more embodiments, mission processing functionality refers to functionality that relates to operations, tasks, or other instructions received from the FOC 102 and/or C2. For example, in one or more embodiments, mission processing functionality refers to tasks associated with flight plan management, communications, payload management, real-time flight planning for energy optimization, and other mission-related functions. In one or more embodiments, mission processing functionality refers to one or more operations of the UAV whose failure, malfunction, or absence would cause mission failure, but would not cause catastrophic failure of the UAV. As will be described in further detail below, mission processing functionality may refer to one or more functions having a lower reliability standard than flight control functions of the UAV.

As used herein, a "processing lane" refers to a series of components within the flight control computer system. For example, a processing lane can refer to a discrete flight control computer including a respective flight control system and mission processing system, and a discrete data concentrator unit with its per lane and bussed I/O. One or more processing lanes may additionally be coupled together via a cross channel data link (CCDL) and a bussed I/O. In one or more embodiments, each of the processing lanes includes redundant components that perform similar functions as each of the other processing lanes.

In addition, as shown in FIG. 2, the flight control system 204 and mission processing system 206 can include software, hardware, or both. For example, the flight control system 204 and mission processing system 206 can include instructions stored on a computer-readable storage medium which one or more processors of the FCC system 202 execute to perform flight control functions and mission processing functions. When executed by the one or more processors, the computer-executable instructions cause the UAV 200 to perform features and functionality described herein. In addition, in one or more embodiments, the FCC system 202 includes hardware, such as a special purpose processing device to perform a certain function or group of functions.

As further shown, the FCC system 202 includes a data concentrator unit system 208 (DCU system 208). In one or more embodiments, the DCU system 208 includes programmable hardware coupled to hardware that executes the flight control functionality and mission processing functionality and which provides data for executing respective functions. In other words, the DCU system 208 communicates with the hardware of the FCC. In one or more embodiments, the DCU system 208 translates received data (e.g., sensor data, mission control data) and provides instructions that facilitate execution of various tasks of the UAV 200.

As will be described in further detail below, the FCC system 202 can include a DCU including per lane and bussed input/output (I/O) systems. In one or more embodiments, the DCU system 208 includes an interface (e.g., a partitioned programming interface) that partitions instructions associated with flight control functionality from instructions associated with mission processing functionality to facilitate effective utility of the common hardware on the FCC system 202 to execute both flight control functions and mission processing functions.

As further shown in FIG. 2, the DCU(s) 208 include lane input/output(s) (I/O(s)) 210. In one or more embodiments, the lane I/O(s) 210 includes an I/O interface for each respective processing lane of the FCC system 202. For example, where an input is to be processed by each of the processing lanes, the I/O interface can couple to an associated sensor for capturing the input. In one or more embodiments, each of the lane I/O(s) 210 receives the independent input, performs any required signal conditioning, filtering, and processing and provides the result to the respective processing lane. In one or more embodiments, the lane I/O(s) 210 includes various interface components including, for example, transceivers, magnetics, drivers, and signal conditioning circuitry for processing inputs and/or outputs to and from each respective processing lane.

In one or more embodiments, the lane I/O(s) 210 provides one to one input/output between the respective processing lane and sensors 218 and effectors 220. Further, in one or more embodiments, the FCC system 202 utilizes lane I/O(s) 210 for sensors redundant to the FCC system 202. For example, in one or more embodiments, each processing lane includes its own independent Internal Navigation System (e.g., sensor).

In one or more embodiments, the DCU system(s) 208 further include a bussed input/output (I/O) interface 212 that interfaces with each of the processing lanes of the FCC system 202. For example, the bussed I/O interface 212 can provide input signals to respective components of the FCC system 202. For instance, in one or more embodiments, the bussed I/O interface 212 receives and provides signals from one or more sensors 218 and provides the signals to the FCC system 202 as an input for flight control functionality and/or mission processing functionality. In one or more embodiments, the bussed I/O interface 212 provides the input signals to the DCU system 208, which communicates with the flight control system 204 and/or mission processing system 206 to execute respective flight control and mission processing functions. Alternatively, in one or more embodiments, the bussed I/O interface 212 receives signals from each of the processing lanes and provides the signals to one or more effectors 220.

In one or more embodiments, the bussed I/O interface 212 facilitates communication between multiple processing lanes (e.g., all processing lanes) of the FCC system 202 to sensors and/or effectors of the UAV 200. For example, in one or more embodiments, many (e.g., all) processing lanes can control a single servo of the UAV 200 jointly or separately. As another example, in one or more embodiments, the bussed I/O interface 212 facilitates communication from a single sensor and/or effector to multiple processing lanes (e.g., all processing lanes) of the FCC system 202. For instance, in one or more embodiments, a single temperature sensor provides the same input (e.g., detected temperature) to all processing lanes.

As further shown in FIG. 2, the FCC system 202 includes a cross channel data link 214 (CCDL 214). In one or more embodiments, the CCDL 214 includes an interface between each of multiple processing lanes within the FCC system 202. As will be described in further detail in connection with FIG. 3, the CCDL 214 is used to pass data between processing lanes to maintain state synchronization between processing lanes of the FCC system 202. For example, in one or more embodiments, the CCDL 214 maintains parallel processing between processing lanes, shares sensor data, shares computed results, and monitors operation of the FCC system 202 to ensure that each of the components within the FCC system 202 are properly operating.

As shown in FIG. 2, the UAV 200 includes power source(s) 216 that provide power to components of the FCC system 202. In addition, the power source(s) 216 provide power to other components within the UAV 200. As described in further detail below, in one or more embodiments, the UAV 200 includes multiple power supplies (e.g., internal power supplies) including redundant power supplies for each processing lane. Providing redundant power sources for each processing lane provides increased reliability, the ability to independently power cycle processing lanes in the event of recoverable failures, the ability to shut down processing lane sin the event of unrecoverable failures, and the ability to place processing lanes to sleep for further power reduction.

As further shown in FIG. 2, the UAV 200 includes sensors 218. In particular, the sensors 218 include hardware of the UAV 200 that receives and provides signals to other components of the UAV 200. For example, the sensors 218 can include various data capturing devices such as GPS, cameras, heat sensors, antennas, accelerometers, gyroscopes, etc. that capture various types of data. In addition, the sensors 218 can include circuitry for processing the captured data including, for example, front end circuitry, analog-to-digital converters (ADCs), amplifiers, etc. and providing processing signals (e.g., filtered signals, digital signals) to circuitry on the FCC system 202. In one or more embodiments, the data concentrator unit system 208 includes one or more components for processing (e.g., conditioning, filtering, analog-to-digital converting, etc.) the captured data. While FIG. 2 shows the sensors 218 coupled to the FCC system 202, in one or more embodiments, the sensors 218 are coupled to the FCC system 202 via the bussed I/O interface 214. In addition, in one or more embodiments, the sensors 218 are coupled to each individual processing lane of the FCC system 202 via individual lane I/O(s) 210.

In addition to the sensors 218, the UAV 200 further includes effectors 220. In particular, the effectors 220 include components (e.g., hardware) of the UAV 200 for carrying out instructions provided by the FCC system 202. For example, in one or more embodiments, the effectors 220 include motors, propellers, landing gear, radios, transmitters, servos, rudders, elevators, and other components for implementing flight control and/or mission control functions. For instance, where the FCC system 202 detects that the UAV 200 becomes off-track from a particular flight control function, the FCC system 202 determines a modification to the operation of the motor, propeller, steering, or other functionality of UAV 200 and provides associated instructions to the effectors 220 to carry out the instructions. As another example, where the FCC system 202 detects a malfunction of an engine, power supply, or other flight critical functionality, the FCC system 202 provides instructions to the effectors 220 to self-correct, power cycle, isolate a particular processing lane, or return to base (RTB) to receive servicing.

Figure 3:
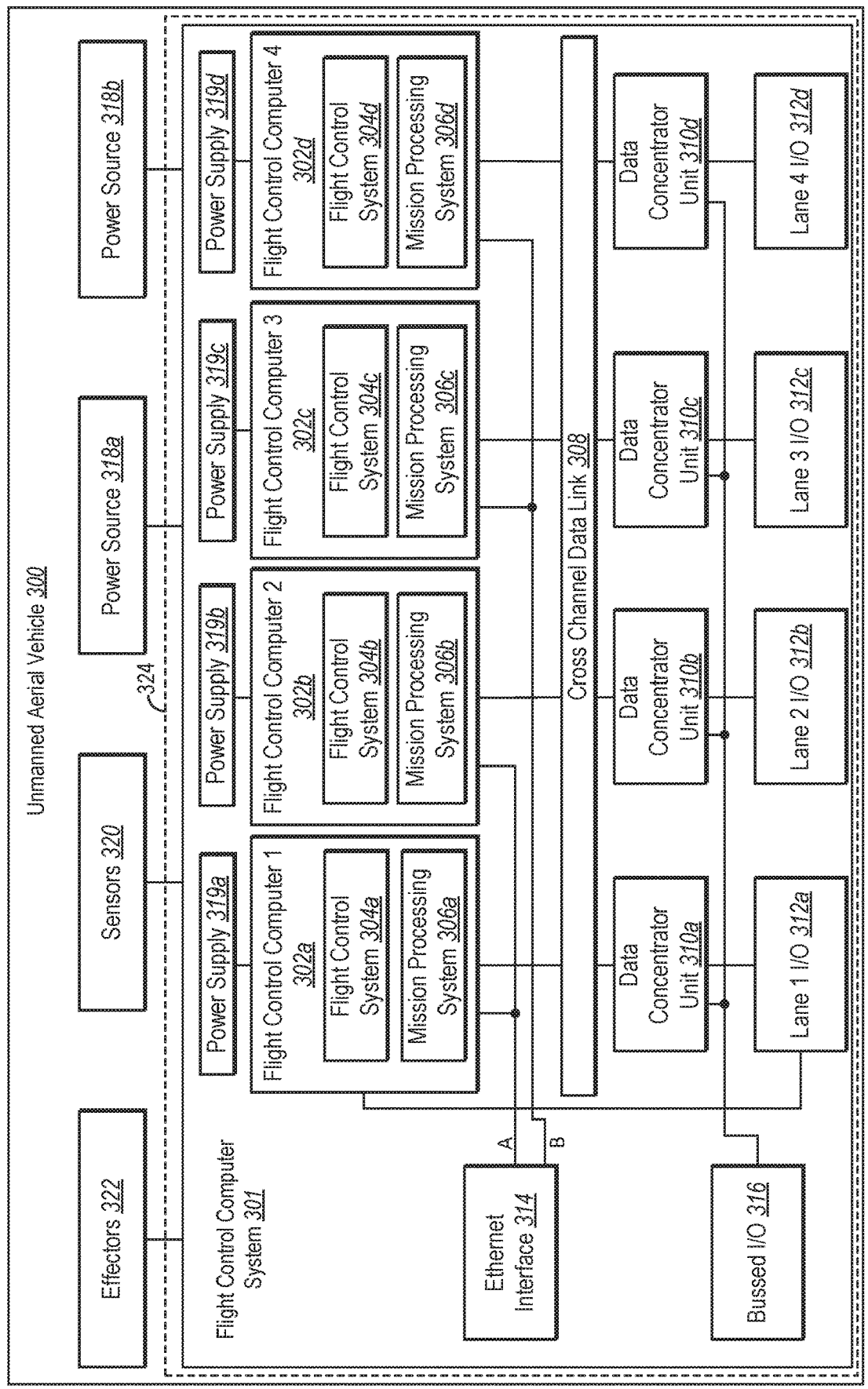
FIG. 3 is a schematic diagram of a UAV including an FCC system in accordance with one or more embodiments.

FIG. 3 provides additional detail with regard to the UAV 200 and associated FCC system. In particular, as shown in FIG. 3 and as described in further detail below, a UAV 300 includes an FCC system 301 that includes multiple processing lanes that provide features and functionality of the UAV 300 while providing redundancy for increasing reliability of both flight control functionality and mission processing functionality. While FIG. 3 illustrates a separate example of the UAV 300, it will be understood that the UAV 300 can include any of the features and functionality as the UAV 200 described above in connection with FIG. 2.

As shown in FIG. 3, the UAV 300 includes a FCC system 301 including multiple processing lanes that each include hardware and software for executing flight control functions and mission processing functions of the UAV 300. For example, as shown in FIG. 3, the FCC system 301 includes a first processing lane including a first flight control computer (FCC) 302a including a flight control system 304a and mission processing system 306a. In addition, the first processing lane includes a first data concentrator unit (DCU) 310a and a first lane I/O 312a. As further shown, the first processing lane includes a first power supply 319a. As further shown in FIG. 3, the FCC system 301 includes additional processing lanes including FCCs 302b-d including respective flight control systems 304b-d and mission processing systems 306b-d. In addition, the additional processing lanes include DCUs 310b-d, lane I/Os 312b-d, and power supplies 319b-c. In one or more embodiments, components of the different processing lanes provide similar functionality (e.g., redundant functionality) as corresponding components in other processing lanes. In addition, as shown in FIG. 3, each of the processing lanes of the FCC system 301 is enclosed within a housing 324.

As further shown, the FCC system 301 includes a cross channel data link (CCDL) 308, an Ethernet interface 314, a bussed I/O 316. Each of the CCDL 308, Ethernet interface 314, and bussed I/O 316 are coupled to each of the processing lanes. In addition, similar to one or more embodiments described above, the UAV 300 includes power sources 318a-b, sensors 320, and effectors 322. Each of these components of the UAV 300 and FCC system 301 may include similar features and functionality as described above. In addition, each of these components can include additional features and functionality, as described in further detail below. In one or more embodiments, the UAV 300 includes power supplies for each processing lane of the FCC system 301.

In one or more embodiments, the FCC system 301 performs flight critical functions including effector control, power management, landing and takeoff, emergency load shedding, etc. The FCC system 301 may also be tasked with mission critical functions including managing of communications subsystems, identification systems, power control systems, health and usage monitoring systems, and mission processing. In one or more embodiments, the FCC system 301 accomplishes each of these functions via redundant and per lane integrated DCUs 310a-d.

As mentioned above, each processing lane of the FCC system 301 includes a respective FCC. In one or more embodiments, each of the FCCs 302a-d includes memory coupled to a processor for executing various instructions. In particular, the FCCs 302a-d can include RAM and flash memory. In one or more embodiments, an FCC includes error correcting code (ECC) memory, NOR flash memory and NAND flash memory. In one or more embodiments, the flash memory includes separate memory for mission processing and flight control functions. In one or more embodiments, the memory of the FCCs 302a-d is coupled to a processor including multiple cores (e.g., quad-core), a platform cache unit, memory controller(s), switches (e.g., Ethernet switches), OS platforms, and connections or interfaces to other components within the FCC system 301.

Moreover, as mentioned above, the FCCs 302a-d include a single processor or system of integrated processors within respective processing lanes that programmed to execute both flight control and mission processing functions. For example, in one or more embodiments, the FCCs 302a-d implement flight control functions including (by way of example and not limitation) redundancy management (RM), contingency management (CMS), flight management (FMS), vehicle management (VMS), takeoff, landing, primary actuation, and autopilot functions. In addition, the FCCs 302a-d can implement mission processing functions including (by way of example and not limitation) communications management (COMM), mission management (MMS), energy optimized flight planning (EOFP), and flight data recorder (FDR) functions. In addition, in one or more embodiments, the FCCs 302a-d facilitate mission processing functions that include payload management. For example, in one or more embodiments, the FCCs 302a-d cause the UAV 300 to provide Internet backhaul, including increased bandwidth and latency to base stations and/or individual devices. For instance, in one or more embodiments, the FCCs 302a-d cause various effectors 322 on the UAV 300 to perform one or more of the functions of the UAV 300 described herein.

With regard to the interfaces (e.g., lane I/Os 312a-d and bussed I/O 316), in one or more embodiments, the FCC system 301 hardware integrates I/O subsystems found within the DCUs 310a-d. As shown in FIG. 3, the I/O subsystem (e.g., lane I/Os 312a-d) are duplicated for each processing lane. As an example, a quad redundant FCC system 301 may include an RS-485 serial port for each lane. Each serial port may be bussed between all lanes. In one or more embodiments, each input is bussed or isolated to provide flexibility. In one or more embodiments, bussed interfaces (e.g., bussed I/O 316) are galvanically isolated such that a failure of one processing lane does not affect the operation of other processing lanes.

In one or more embodiments, the bussed I/O 316 includes multiple RS-485 interfaces that are each coupled to all processing lanes. As an example, in one or more embodiments, the bussed I/O 316 includes eight RS-485 interfaces that are each coupled to all processing lanes. In addition, each processing lane may be configured to be on or off for each bus. For example, signaling from each of the processing lanes may be used to vote one or more processing lanes off the bussed I/O 316, effectively decoupling a given processing lane from each of the other processing lanes.

In one or more embodiments, the bussed I/O 316 includes a plurality of different types of interfaces. For example, in one or more embodiments, the bussed I/O 316 includes full duplex serial interfaces, high input impedance analog inputs, avionics input channels, and discrete TTL compatible inputs. In addition, in one or more embodiments, the lane I/Os 312a-d include full duplex serial interfaces including point to point serial ports, control area network (CAN) interfaces, avionics output channels capable of OPEN/GNG operation, TTL compatible input and output channels, constant current outputs, VDC excitation supplies, ARINC 429 inputs and outputs, and one or more maintenance and programming interfaces. In addition, each of the various interfaces can be coupled to each respective processing lane. Further, each of the bussed interfaces can be decoupled from each of the respective processing lanes (e.g., where one lane is outputting inconsistent results).

With regard to the cross-channel data link 308 (CCDL 308), as mentioned above, the CCDL 308 provides a fully connected network between the respective processing lanes. For example, in one or more embodiments, the CCDL 308 includes a peripheral component interconnect express (PCIe) without a bridge or switch while providing full connectivity between the processing lanes. In one or more embodiments, the CCDL 308 is used to pass data between processing lanes to maintain state synchronization between the processing lanes, maintains lockstep execution between the processors and other shared hardware between the flight control system(s) 304a-d and mission processing system(s) 306a-d, shares sensor data, and shares computed results. In one or more embodiments, the CCDL 308 enables synchronization of the processing lanes by synchronizing clocks of processing lanes within a threshold time period (e.g., 100 ns).

In one or more embodiments, the processing lanes monitor various inputs/outputs to the processing lanes and determines whether a particular processing lane is malfunctioning or otherwise producing inaccurate results. In one or more embodiments, the processing lanes vote on sensor inputs and effector outputs. As an example, in one or more embodiments, the processing lanes determines which sensor inputs are to be used by the processing lanes. Moreover, in one or more embodiments, the processing lanes monitors inputs and outputs to determine which processing lanes are operating correctly or incorrectly. Where an input or output is inconsistent with inputs or outputs for other processing lanes, the FCC system can isolate the inconsistent processing lane and exclude the processing lane from affecting the operation of the UAV 300. For example, in one or more embodiments, the FCCs 302a-d and/or CCDL 308 can isolate the inconsistent processing lane and decouple or otherwise exclude the processing lane from adversely affecting operation of the UAV 300.

The CCDL 308 can include various network features. For example, in one or more embodiments, the CCDL 308 includes three channel TTE capable Ethernet interfaces per processing lane with three integrated TTE switches having twelve Ethernet ports on an external interface (e.g., on an outside of the housing 324 that encloses the FCC system 301). As another example, in one or more embodiments, the CCDL 308 includes a TTP based solution including Ethernet switches (or other types of switches) for redundancy. Each processing lane may connect to both network switches with a remaining number of ports (e.g., 8 from each switch) included on an external interface of the FCC system 301. As another example, in one or more embodiments, the CCDL includes a PCIe based solution including three PCIe interfaces on each processing lane to form a fully connected mesh of point to point interfaces between the processing lanes. In one or more embodiments, the fully connected mesh is enclosed within the housing 324 of the FCC system 301, without providing an external interface for the individual processing lanes. This PCIe-based solution may integrate various types of Ethernet switches for redundancy and for providing IP based connectivity to mission critical components.

As shown in FIG. 3, the FCC system 301 includes an Ethernet interface 314. In particular, as shown in FIG. 3, the Ethernet interface includes a first network (A) and a second network (B). In one or more embodiments, the first Ethernet network is coupled to the first and second processing lanes while the second Ethernet network is coupled to the third and fourth processing lanes. Alternatively, in one or more embodiments, each of the Ethernet networks are coupled to each of the processing lanes, providing redundancy for the FCC 302a-d of each processing lane.

In one or more embodiments, the Ethernet interface 314 interfaces with the mission processing system 306a-d from each processing lane. For example, the Ethernet interface 314 provides a communication interface whereby the FCC system 310 communicates with command and control. In one or more embodiments, mission processing exclusive communications may be communicated via the Ethernet interface 314. Accordingly, in one or more embodiments, the Ethernet interface 314 provides communications exclusively for mission processing functionality. In one or more embodiments, the Ethernet networks are galvanically isolated, similar to other components of respective processing lanes described herein.

As shown in FIG. 3, the FCC system 301 includes DCUs 310a-d for each of the processing lanes. In one or more embodiments, the DCUs 310a-d include an analog circuitry interface, signal conditioning, bus isolation, and filtering circuitry. As shown in FIG. 3, the FCC system 301 includes a DCU for each respective processing lane, providing a similar level of redundancy for both flight control functionality and mission processing functionality.

In one or more embodiments, the FCCs 302a-d include programmable hardware that facilitates implementation of both flight control functionality and mission processing functionality by hardware within the same processing lane. Indeed, even where flight control functionality and mission processing functionality execute instructions via software having different design assurance levels (DALs), the FCCs can partition data and instructions provided to the FCCs 302a-d for respective functionalities of the UAV 300. Accordingly, in one or more embodiments, each of the processing lanes include a portioned programming interface that facilitates functionality (e.g., mission processing and flight control functionalities) having different DAL minimums within the processing lane.

For instance, in an example where flight control functionality involves DAL B rated software and mission processing functionality involves DAL E rated software, the DCUs 310a-d can partition data provided to the FCCs 302a-d for accomplishing respective functionality associated with different DAL. In one or more embodiments, the FCC 302a-d implement space and time-based partitioning using an ARINC 653 compliant real-time operating system on each respective FCC. Utilizing the partitioning platform in this way facilitates streamlined software development and facilitates sharing hardware between both the flight control systems 304a-d and mission processing systems 306a-d within the same processing lanes.

By combining the FCCs 302a-d, DCUs 310a-d, and other components of the FCC system 301 within parallel processing lanes and within the same enclosure, the UAV 300 can be produced for a fraction of the cost. For example, even though the FCCs 302a-d include more robust hardware for executing both flight control functionality and mission processing functionality, having redundant processing lanes incorporated within a single housing 324 substantially decreases costs associated with the DCUs 310a-d, lane I/O 312a-d, the bussed I/O 316, and the CCDL 308, which contribute to an overall decrease in cost and weight of the UAV 300. In one or more embodiments, the housing 324 includes an LRU that encloses the components of the FCC system 301 including components for each of the processing lanes. This decreased cost and weight is accomplished while increasing redundancy of the FCC system 301, particularly with regard to mission control functionality, which may have reduced redundancy standards (in comparison to flight control functionality standards). Accordingly, the features and functionality reduce the SWaP-C of the UAV 300 while increasing the overall redundancy of the FCC system 301.

As further shown, the FCC system 301 includes power supplies 319a-d for each of the processing lanes. In one or more embodiments, the power supplies 319a-d (e.g., internal FCC power supplies) are coupled to the power source(s) 318a-b (e.g., external power sources) for the UAV 300. As mentioned above, the power supplies 319a-d can provide redundant power for each of the processing lanes. By implementing internal power supplies in connection with four processing lanes that each include flight control and mission processing capabilities, the FCC system 301 can implement power cycling to decrease the total power consumption and more efficiently utilize resources on the FCC system 301.

As mentioned above, the FCC system 301 includes various features and functionalities that reduce fuel requirements, reduce overall size, and/or lengthen the potential flight time of the UAV 300 while reducing LRU costs, repair, servicing, or other maintenance. Indeed, the combination of various features and functionality described herein substantially lengthens the overall flight time of the UAV 300 over conventional aerial devices.

For example, combining hardware (e.g., processor(s) of the FCCs 302a-d) for performing both flight control and mission processing functions, switches, interfaces, wiring, PCBs, and other components are reduced throughout the FCC system 301, causing the UAV 300 to weigh considerably less. Indeed, while combining functions within the same FCC may increase the weight of the integrated FCC over a single conventional FCC device, the fact that only a single integrated FCC is needed rather than 4 separate FCCs and two mission computers, significantly reduces the overall weight of UAV. Furthermore, a single integrated FCC allows for less wiring, networking, switches, I/O interfaces, Ethernet interfaces, etc.

In addition to lighter circuitry, the FCC system 301 reduces weight of the UAV 300 by enclosing the different processing lanes within a single housing 324. For example, rather than having individual housing for the FCCs 302a-d, DCUs 310a-d, or individual housing around respective processing lanes, the FCC system 301 includes the housing 324 that encloses all of the processing lanes, further reducing the overall weight of the UAV 300 as a result of less material from housings for individual processing lanes that contribute to the overall weight of the UAV 300.

Figure 4:
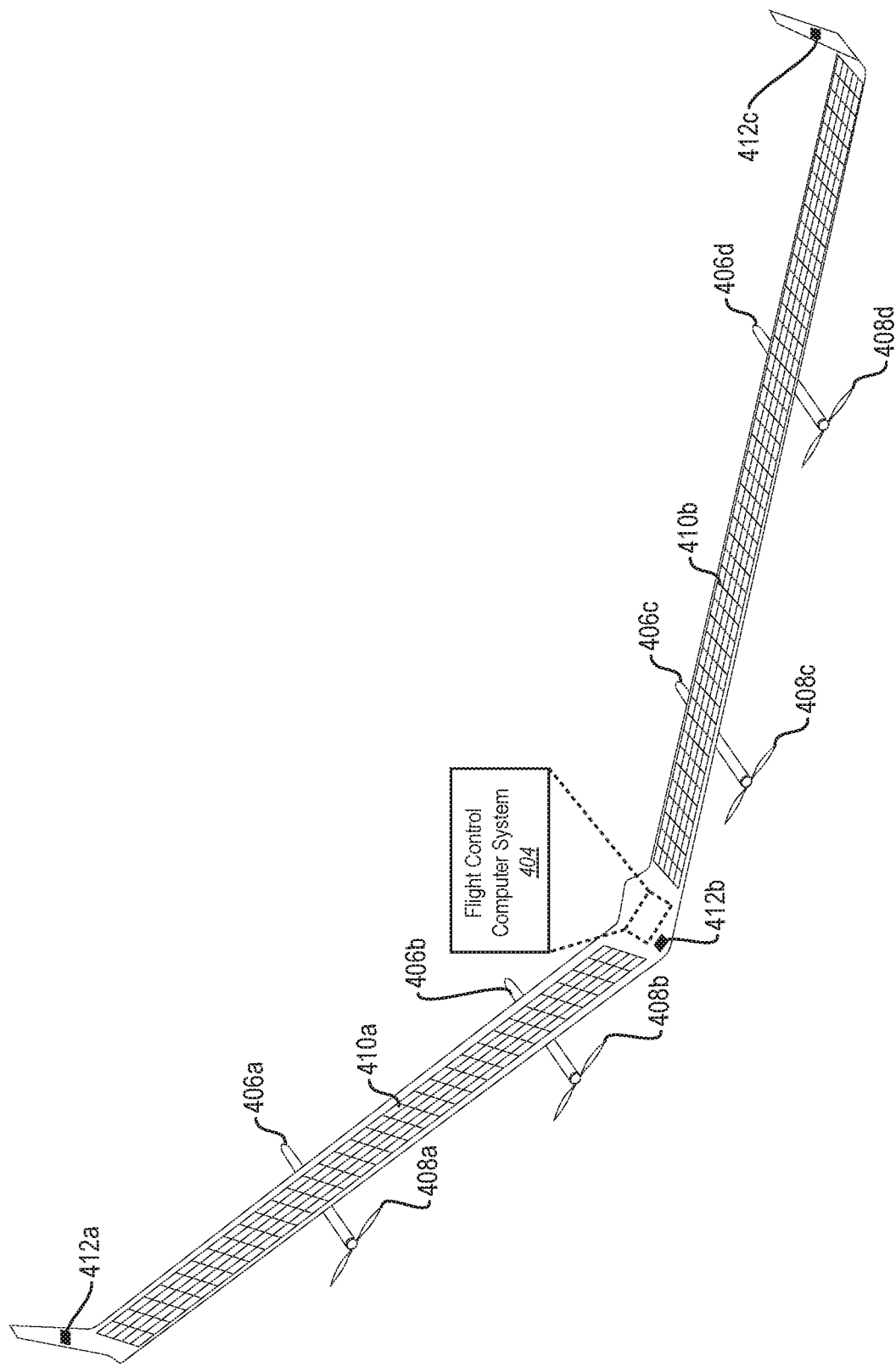
FIG. 4 illustrates an example UAV including an FCC system implemented thereon in accordance with one or more embodiments.

As mentioned above, one or more embodiments of an FCC system including features and functionality described herein can be implemented on a UAV. For example, FIG. 4 illustrates an example UAV 402 including an FCC system 404 implemented thereon. The FCC system 404 can include similar features and functionality as described above in connection with the FCC systems 202, 301 described above in connection with FIGS. 2 and 3. In addition, similar to one or more embodiments described herein, the FCC system 404 can couple to any number of components of the UAV 402 including sensors, effectors, power sources, and other electronic components that implement functionality of the UAV 402.

As shown in FIG. 4, the UAV 402 includes a central body and wings extending outward from the central body. As further shown, the UAV 402 includes motors 406a-d and propellers 408a-d spaced across the wings of the UAV 402. For example, the UAV 402 shown in FIG. 4 includes first and second motors 406a-b attached to a first wing of the UAV 402. The UAV 402 further includes third and fourth motors 406c-d attached to a second wing of the UAV 402. As shown in FIG. 4, each of the motors 406a-d drive respective rotors 408a-d similarly positioned across the body of the UAV 402. In one or more embodiments, the motors 406a-d and rotors 408a-d refer to example effectors described above in connection with FIGS. 2 and 3. Nevertheless, it will be understood that the UAV 402 can include other effectors (e.g., fins, landing gear, wings, etc.).

In one or more embodiments, the FCC system 404 effects functionality of the effectors of the UAV 402. For example, in one or more embodiments, the FCC system 404 implements mission control and/or processing functions causing the motors 406a-d, rotors 408a-d, and other effectors of the UAV 402 to vary the speed, direction, altitude, or flight path of the UAV 402. For example, the FCC system 404 can provide any number of signals to various effectors to cause the UAV 402 to move in relation to one or more gateways, base stations, or other customer premise equipment (CPE). In addition, the FCC system 404 can provide instructions to the effectors that cause the UAV 402 to take off, land, or return to a fleet operation center (FOC) to receive service or maintenance.

As further shown in FIG. 4, the UAV 402 includes solar panels 410a-b. In particular, as shown in FIG. 4, the UAV 402 includes a first solar panel 410a attached to a top surface of a first wing of the UAV 402 and a second solar panel 410b attached to a top surface of a second wing of the UAV 402. The solar panels 410a-b can provide power to components of the UAV 402, including the FCC system 404. In one or more embodiments, the solar panels 410a-b provide a primary source of power to components of the UAV 402. Alternatively, in one or more embodiments, the solar panels 410a-b provide a supplemental or secondary power source to components of the UAV 402. In one or more embodiments, the solar panels 410a-b are coupled to a number of internal power supplies of the FCC system 404. For example, one or both of the solar panels 410a-b can be coupled to internal power supplies for each of the processing lanes of the FCC system 404 described above.

As shown in FIG. 4, the UAV 402 further includes antennas 412a-c positioned at various points on the UAV 402. For example, the UAV 402 includes a first antenna 412a positioned on the first wing, a second antenna 412b positioned on a nose of the UAV 402 and a third antenna 412c positioned on the second wing. The UAV 402 can include fewer or additional antennas. In addition, the antennas 412a-c can receive and/or transmit signals to and from the UAV 402. For example, in one or more embodiments, the antennas 412a-c can receive mission control instructions (e.g., from a gateway). In addition, in one or more embodiments, the antennas 412a-c can transmit signal(s) to CPE and facilitate delivering Internet backhaul to end-user devices. In one or more embodiments, the antennas 412a-c refer to example sensors described above in connection with FIGS. 2 and 3. Nevertheless, it will be understood that the UAV 402 can include other sensors (e.g., temperature sensors, altitude sensors, motion sensors, etc.).

As mentioned above, the UAV 402 includes the FCC system 404 includes features and functionality described herein. As shown in FIG. 4, the FCC system 404 can enclose the FCC system 404 within the body of the UAV 402. In addition, the FCC system 404 can communicate with each of the components 406a-412c (and other components) of the UAV 402 to implement mission processing functions and flight critical functions of the UAV 402. Moreover, while FIG. 4 illustrates one embodiment of the UAV 402 including a specific shape and arrangement of components, the UAV 402 can be implemented using a variety of shapes and arrangement of components.

Figure 5:
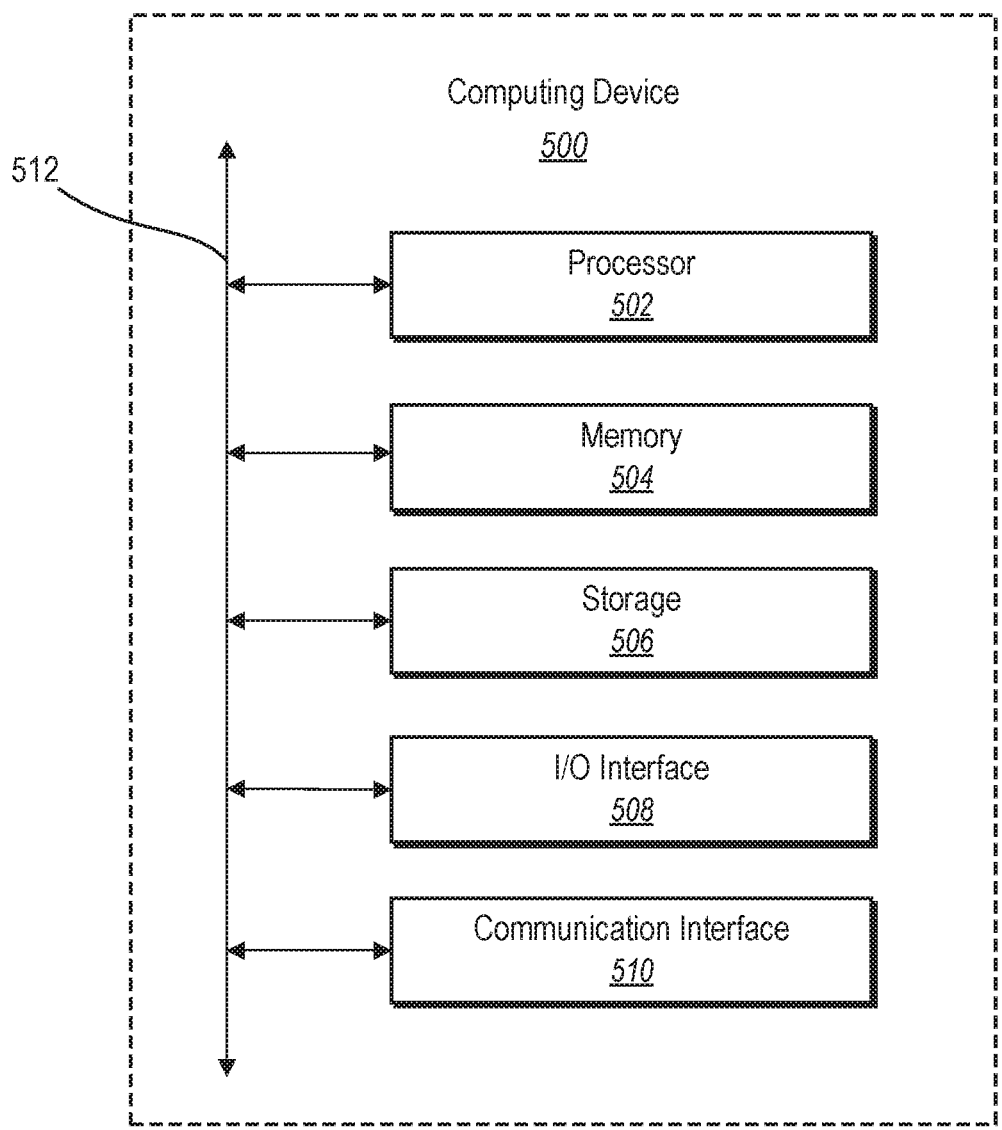
FIG. 5 illustrates a block diagram of an example computing device in accordance with one or more embodiments.

FIG. 5 illustrates, in block diagram form, an exemplary computing device 500 that may be configured to perform one or more of the processes described above. In one or more embodiments, the FOC 102 and/or FCC system 202, 301 comprise one or more computing devices in accordance with implementations of computing device 500. As shown by FIG. 5, the computing device can comprise a processor 502, a memory 504, a storage device 506, an I/O interface 508, and a communication interface 510, which may be communicatively coupled by way of communication infrastructure 512. While an exemplary computing device 500 is shown in FIG. 5, the components illustrated in FIG. 5 are not intended to be limiting. Additional or alternative components may be used in other embodiments. Furthermore, in certain embodiments, a computing device 500 can include fewer components than those shown in FIG. 5. Components of computing device 500 shown in FIG. 5 will now be described in additional detail.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage device 506 and decode and execute them. In particular embodiments, processor 502 may include one or more internal caches for data, instructions, or addresses. As an example and not by way of limitation, processor 502 may include one or more instruction caches, one or more data caches, and one or more translation lookaside buffers (TLBs). Instructions in the instruction caches may be copies of instructions in memory 504 or storage 506.

Memory 504 may be used for storing data, metadata, and programs for execution by the processor(s). Memory 504 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 504 may be internal or distributed memory.

Storage device 506 includes storage for storing data or instructions. As an example and not by way of limitation, storage device 506 can comprise a non-transitory storage medium described above. Storage device 506 may include removable or non-removable (or fixed) media, where appropriate. Storage device 506 may be internal or external to the computing device 500. In particular embodiments, storage device 506 is non-volatile, solid-state memory. In other embodiments, Storage device 506 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 508 allows a user to provide input to, receive output from, and otherwise transfer data to and receive data from computing device 500. For example, in one or more embodiments, the FOC 102 can include an I/O interface 508 that enables a user to provide input, receive output, or otherwise transfer data to and receive data from a computing device 500. I/O interface 508 may include a mouse, a keypad or a keyboard, a touch screen, a camera, an optical scanner, network interface, modem, other known I/O devices or a combination of such I/O interfaces. I/O interface 508 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 508 is configured to provide graphical data to a display for presentation to a user. The graphical data may be representative of one or more graphical user interfaces and/or any other graphical content as may serve a particular implementation.

Communication interface 510 can include hardware, software, or both. In any event, communication interface 510 can provide one or more interfaces for communication (such as, for example, packet-based communication) between computing device 500 and one or more other computing devices or networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. An unmanned aircraft vehicle (UAV) comprising:
   a flight control computer system, the flight control computer system comprising:
   multiple processing lanes, each processing lane comprising:
   a flight control computer (FCC) comprising hardware programmed to execute flight control functions and mission processing functions;
   a data concentrator unit that communicates with the hardware of the FCC to execute flight control functions and mission processing functions; and
   an input/output (I/O) interface coupled to each of the FCC and the data concentration unit; and
   a bussed I/O interface coupled to the data concentration unit for each of the processing lanes.

2. The UAV of claim 1, wherein the flight control computer system comprises a housing that encloses the multiple processing lanes.

3. The UAV of claim 1, wherein the hardware programmed to execute flight control functions and mission processing functions comprises a processor programmed to execute both flight control functions and mission processing functions.

4. The UAV of claim 1, further comprising an Ethernet interface coupled to the flight control computer for each of the processing lanes, the Ethernet interface comprising a first Ethernet network and a second Ethernet network, each of the Ethernet networks selectively coupled to a flight control computer for each of the processing lanes via Ethernet switches.

5. The UAV of claim 1, wherein the flight control computer system comprises a plurality of internal power supplies coupled to the multiple processing lanes.

6. The UAV of claim 5, wherein each processing lane of the multiple processing lanes comprises an internal power supply from the plurality of internal power supplies.

7. The UAV of claim 1, wherein the FCC comprises a partitioned programming interface that facilitates functionality having different design assurance level (DALs) minimums within the processing lane.

8. The UAV of claim 1, wherein the hardware programmed to execute flight control functions and mission processing functions provides redundancy for flight control functions and mission processing functions across the multiple processing lanes.

9. The UAV of claim 1, wherein each processing lane of the multiple processing lanes is galvanically isolated from other processing lanes of the multiple processing lanes.

10. The UAV of claim 1, wherein the flight control computer system comprises a cross channel data link (CCDL) that provides an interconnected mesh between the processing lanes.

11. The UAV of claim 10, wherein the CCDL comprises a peripheral component interconnect express (PCIe) that provides connectivity between the multiple processing lanes without one or more bridges or switches connecting the multiple processing lanes.

12. The UAV of claim 1, wherein the FCCs from the multiple processing lanes cooperate to maintain state synchronization between the multiple processing lanes.

13. The UAV of claim 1, wherein the FCCs from the multiple processing lanes:
   monitor outputs from the multiple processing lanes; and
   upon detecting one or more inconsistent outputs from a processing lane of the multiple processing lanes, disconnects the processing lane from other processing lanes within the flight control computer system.

14. A system comprising:
   an unmanned aerial vehicle (UAV) comprising a flight control computer system, the flight control computer system comprising multiple processing lanes enclosed within a housing on the UAV, wherein each of the processing lanes comprises:

a flight control computer (FCC) comprising hardware programmed to execute flight control functions and mission processing functions; and a data concentrator unit that communicates data with the hardware of the FCC to execute flight control functions and mission processing functions; and a fleet operation center (FOC) in communication with the UAV via a gateway by way of a radio frequency (RF) communication link between the FOC and the gateway.

15. The system of claim 14, wherein the housing comprises a line replaceable unit (LRU) that encloses the multiple processing lanes.

16. The system of claim 14, wherein each of the processing lanes of the flight control computer system comprises an input/output (I/O) interface coupled to the FCC and the data concentration unit, and wherein the flight control computer system further comprises a bussed I/O interface coupled to each of the processing lanes.

17. The system of claim 14, wherein the FCC comprises a partitioned programming interface that facilitates functionality having different design assurance level (DALs) minimums within the respective processing lanes.

18. The system of claim 14, wherein the hardware programmed to execute flight control functions and mission processing functions comprises a processor programmed to execute both flight control instructions and mission processing instructions received from the FOC.

19. A flight control computer system comprising:

multiple processing lanes, each processing lane comprising:

a flight control computer (FCC) comprising hardware programmed to execute flight control functions and mission processing functions;

a data concentrator unit that communicates with the hardware of the FCC to execute flight control functions and mission processing functions; and an input/output (I/O) interface coupled to each of the FCC and the data concentration unit; and a bussed I/O interface coupled to the data concentration unit for each of the processing lanes.

20. The flight control computer system of claim 19, further comprising a housing that encloses the multiple processing lanes.

* * * * *